UNITED STATES PATENT OFFICE.

RICHARD LAUCH, OF BERLIN, GERMANY, ASSIGNOR TO ACTIEN GESELLSCHAFT FÜR ANILIN FABRIKATION, OF BERLIN, GERMANY.

ORANGE LAKE DYE AND PROCESS OF MAKING SAME.

No. 912,138.   Specification of Letters Patent.   Patented Feb. 9, 1909.

Application filed September 28, 1908. Serial No. 455,188.

*To all whom it may concern:*

Be it known that I, RICHARD LAUCH, a subject of the German Emperor, residing at Berlin, Germany, and whose post-office address is Am Karlsbad 20, have invented certain new and useful Improvements in New Orange Lake Dyestuff and Processes of Making Same, of which the following is a specification.

My invention relates to a monoazo-dyestuff which is suitable for the production of color-lakes and is based on the observation that the dyestuff which may be obtained by combining the diazo-compound of ortho-para-dinitroanilin $(NH_2:NO_2:NO_2 = 1:2:4)$ with beta-naphthol is especially adapted for color-lakes. Thus when the dyestuff is precipitated on a lake base such as for instance aluminium hydrate or barium sulfate or aluminium hydrate in combination with barium sulfate a lake is obtained which shows a brilliant orange shade, which is very fast to light and fast to lime and possesses a very great body, *i. e.* an excellent covering power; furthermore the dyestuff as well as the lakes are insoluble in oil and can be well varnished over. The dye or the lake may therefore be used for example as wall-paper color, printing color or oil color.

The following example illustrates the invention, the parts being by weight:

Example: The diazo-compound formed from 18.3 parts of ortho-para-dinitroanilin is introduced while stirring well into 14 parts of finely divided beta-naphthol, prepared for instance by dissolving it in an alkali and precipitating in the cold by the addition of hydrochloric acid. The combination should occur at a temperature of 0° C., the formation of the dyestuff beginning at once. After about 12 hours the mass is slightly heated and the dyestuff isolated by draining and washing, obtaining thus a paste of a very brilliant orange shade which may directly be used for the manufacture of lakes or may be dried.

The new monoazo-dyestuff obtained as above forms in the dry state a very brilliant orange colored powder insoluble in water, alcohol, diluted hydrochloric acid and diluted soda-lye. In concentrated sulfuric acid it dissolves to a cherry-red colored solution which on the addition of ice separates red flakes.

By the action of strong reducing agents the dyestuff is split up yielding 2.4-dinitroanilin besides 1.2-amido-naphthol.

Now what I claim is,—

As a new article of manufacture a new orange monoazo-dyestuff which can be obtained by diazotizing ortho-para-dinitroanilin $(NH_2:NO_2:NO_2 = 1:2:4)$ and combining the diazo-compound thus obtained with beta-naphthol, and which dyestuff is especially adapted for the manufacture of lakes, this coloring-matter forming in the dry state a powder of a very brilliant orange shade, which is insoluble in water, alcohol, diluted hydrochloric acid and diluted soda-lye, but which dissolves in concentrated sulfuric acid to a cherry-red solution which solution on the addition of ice separates red flakes, this new dyestuff by the action of strong reducing agents being split up yielding 2.4-dinitroanilin besides 1.2-amidonaphthol.

In testimony whereof I have hereunto set my hand in presence of two subscribing witnesses.

RICHARD LAUCH.

Witnesses:
 HENRY HASPER,
 WOLDEMAR HAUPT.